Dec. 25, 1956   G. E. BULLOCK   2,775,088
FRUIT PICKING APPARATUS
Filed Dec. 10, 1954   3 Sheets-Sheet 2

INVENTOR.
GILES E. BULLOCK
BY
ATTORNEY

United States Patent Office 2,775,088
Patented Dec. 25, 1956

2,775,088

FRUIT PICKING APPARATUS

Giles E. Bullock, Rochester, N. Y.

Application December 10, 1954, Serial No. 474,432

11 Claims. (Cl. 56—332)

This invention relates to vacuum fruit picking apparatus and more particularly to rotary stem severing mechanism therefor.

In copending application 235,689, filed July 9, 1951, and now Patent No. 2,711,625, and Patent No. 2,661,587, there is disclosed a vacuum actuated fruit picking head in which fruit such as apples, peaches, oranges and the like are adapted to be received in an open end of a portable tubular vacuum picking head so as to substantially close the end thereof temporarily, resulting in atmospheric pressure exerting a picking force tending to propel the fruit into the head. The fruit upon severance passes into the head, relieving the vacuum and thereafter promptly passes through a valve in the bottom of the head to a conveyor or tube, clearing the head immediately for rapid successive picking. While the differential pressure exerts sufficient pull on the fruit to break the stem, stem cutting devices are disclosed to assist the operation where the fruit supporting branch yields too readily to the pull of the picking head.

The present invention is directed to an improved stem severing mechanism adapted to apply a twist, or a pull and a twist to the supporting stem to break the same, the operation being similar to that manually effected by hand picking. The torsional stress thus imposed tends, to shear the stem at its weakest point and avoids the danger of severing the fruit beyond the stem as by severing a twig of the fruit bearing tree, which may be liable to severance on tension, but which due to its large diameter would resist severance, in favor of severing the stem proper upon an application of a twisting or torsional force.

The invention is directed to a picking head in which the fruit engaging end is caused to rotate, such end having a resilient distendable orifice through which the fruit passes, and which will frictionally grip the body of the fruit on contact, and thus cause the fruit to rotate to twist the stem to the severing point. Further, the invention provides for rotating the picking end by flow of air from the head as produced by the source of vacuum supply. Additionally, inertia means is utilized for storing energy between the actual picking of successive fruit, such stored energy being applied to the rotation of a fruit during actual picking to twist and sever the stem and being the principle source of power during such severing operation.

The invention is further embodied in a light weight sturdy and simple construction associated with the head, and so designed as to derive its power from the available flow of air produced by the vacuum, without interfering with the normal operation of the vacuum picking head.

The above and other novel features of the invention will appear more fully hereinafter from the following detailed description, when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
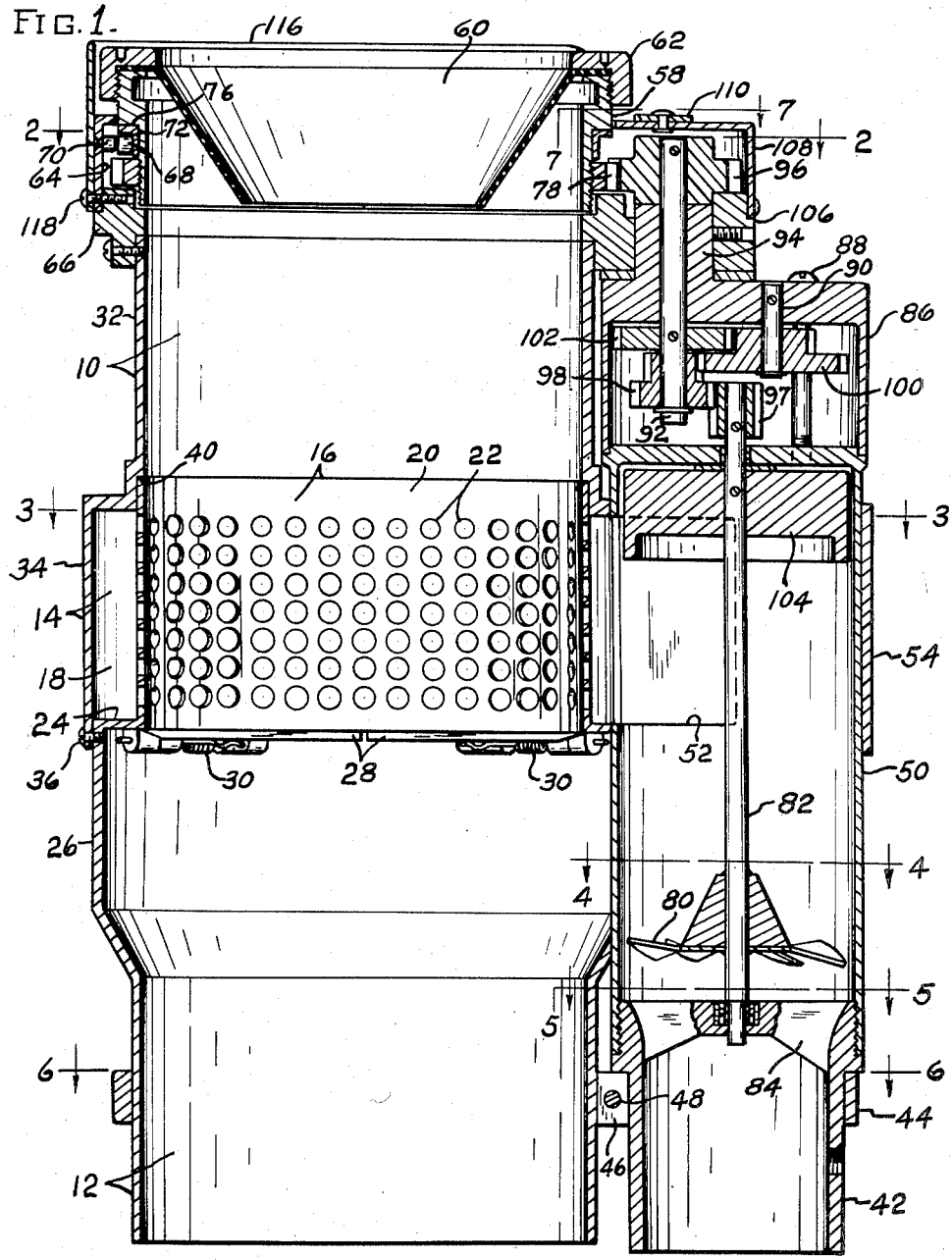
Figure 1 is a vertical sectional view through the head, taken substantially on the line 1—1 of Figure 2.
Figure 2:
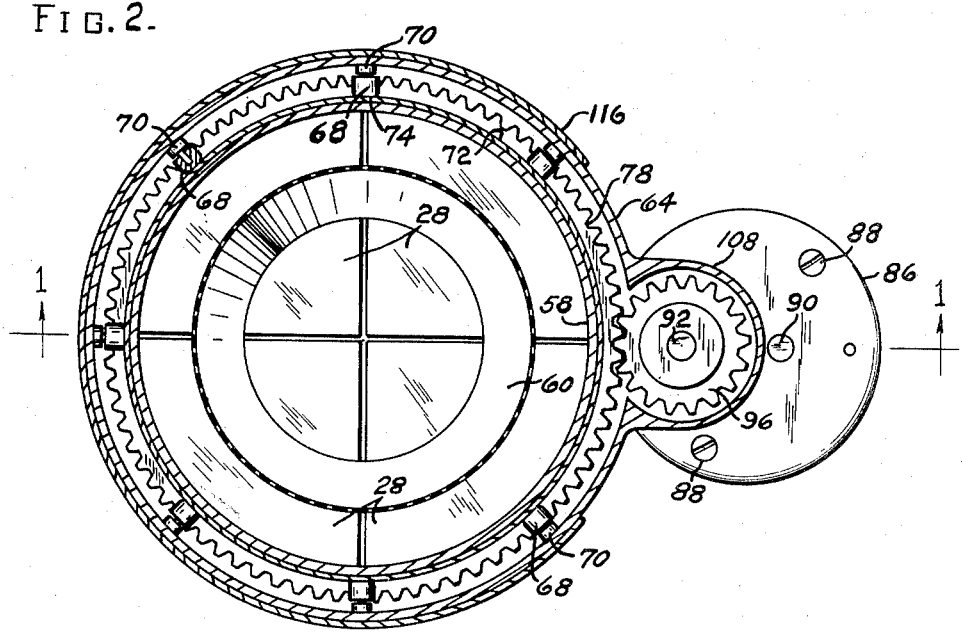
Figure 2 is a transverse sectional view through the head, taken substantially on the line 2—2 of Figure 1.
Figure 3:
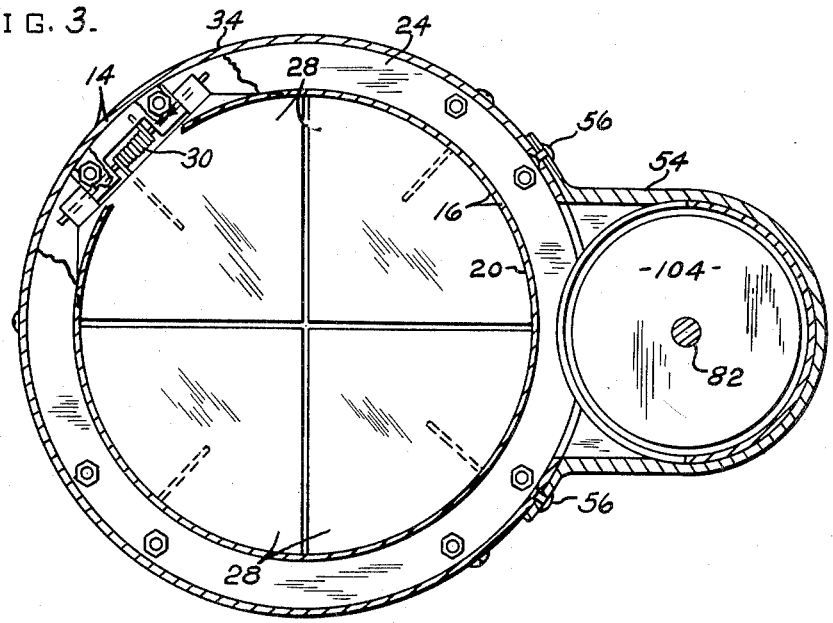
Figure 3 is a transverse sectional view through the head taken substantially on the line 3—3 of Figure 1.
Figure 4:
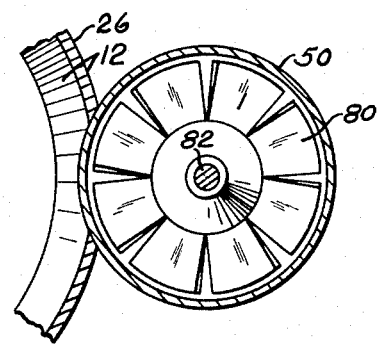
Figure 4 is a transverse mid-sectional view taken through the vacuum motor chamber, substantially on the line 4—4 of Figure 1.
Figure 5:
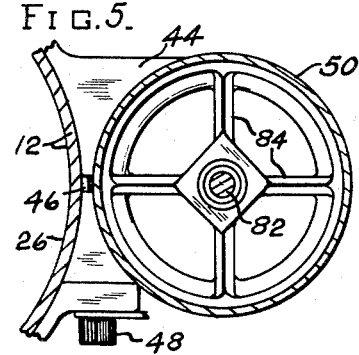
Figure 5 is a transverse lower sectional view taken through the vacuum motor chamber substantially on the line 5—5 of Figure 1.
Figure 6:
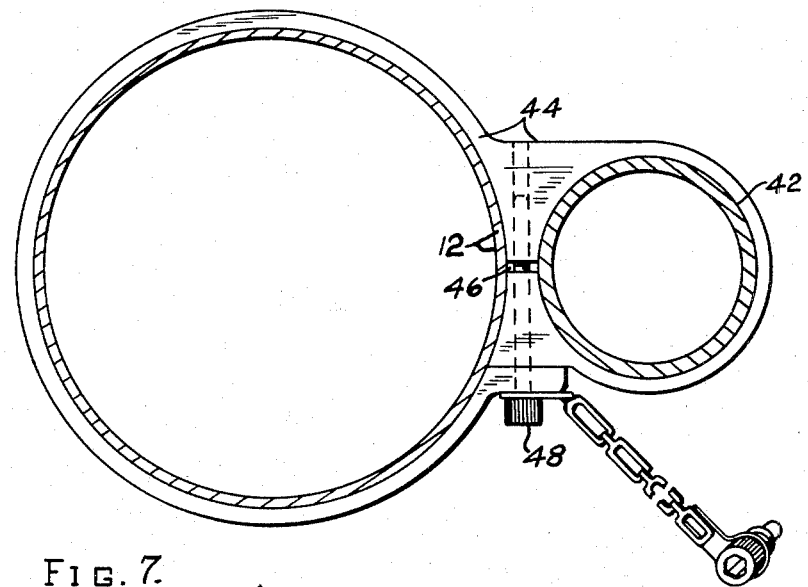
Figure 6 is a transverse sectional view through the lower portion of the head taken substantially on the line 6—6 of Figure 1.
Figure 7:
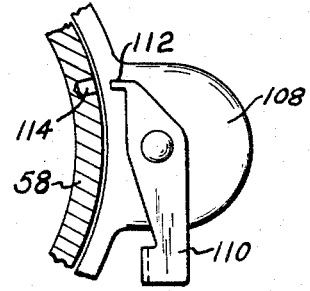
Figure 7 is a fragmentary sectional view showing the rotary head lock taken from the line 7—7 of Figure 1.

Referring to Figure 1, there is shown a fruit picking head composed of a pair of substantially cylindrical or tubular members 10 and 12 having outwardly and inwardly stepped overlapping or telescopic portions 14 and 16 providing an annular vacuum chamber 18. The members 10 and 12 provide a passage through which a fruit may pass, after having been severed from the fruit tree, such fruit passing downwardly through the lower end of the member 12 into a discharge conduit (not shown) of the type shown in copending application Serial No. 235,689, filed July 9, 1951. The annular chamber is formed by an inner cylindrical wall or sleeve 20, having a multiplicity of perforations 22, which wall may be an integral part of the lower member 12, there being a radial offset or step 24 at the lower end of the perforate wall to provide an enlarged diameter portion 26 of the member 12, which may be referred to as a valve chamber.

Pivotally secured to the underside of the step 24 are segmental valve members 28, which are normally held closed by light springs 30, and which readily open in response to the weight or downward movement of a fruit in the sleeve 20. The valve structure may be similar to that shown in U. S. Patent No. 2,661,587, issued December 8, 1953.

The upper member 10 has a cylindrical portion 32 aligned with the sleeve 20, and an outwardly offset jacket portion 34 surrounding the sleeve 20, such jacket portion extending to the valve chamber portion of the member 12, and being secured thereto as at 36. The cylindrical portion has an annular offset 40 to receive the upper end of the sleeve 20.

A vacuum supply conduit 42 extends alongside the lower end of the member 12, and is secured thereto by a double clamp ring 44 embracing the conduit and member 12, the ring being split as at 46 and provided with a clamp screw 48 to secure the parts. The upper end of the conduit is provided with an elongated cylindrical cap 50, which forms a connection between the conduit 42 and the annular chamber 18, the outer wall 34 of the chamber as well as a portion of the valve chamber wall 26 being cut away to receive in nesting relation the cylindrical body portion of the cap. The upper end of the cylindrical body portion facing the annular chamber 18 is cut away as at 52 to freely communicate therewith, and a U-shaped shroud 54 embraces the outer wall of the body portion of the cap 50 and is affixed to the outer wall 34 as at 56 to seal the connection between the body portion 50 and the annular chamber 18.

Upon the upper end of the member 10 is a rotary orifice ring assembly adapted to receive a fruit, comprising a sleeve 58 mounted in substantial alignment with the tubular member 10, such sleeve supporting on its upper end a resilient conical fruit engaging orifice defining member 60, the latter being clamped in place on the end of the sleeve by a threaded flanged collar 62. The sleeve is journalled within a bearing ring 64, which is supported on a collar member 66 mounted directly on the upper end of the member 10. The bearing ring is provided with a plurality of rollers 68 mounted on inwardly directed radial stub shafts 70, the sleeve being provided with an angle sectioned bearing race, the cylindrical portion 72 of which is centered against the inner ends 74 of the rollers, and the radial portion 76 of which bears on the peripheries of the rollers.

Below the bearing race, a ring gear 78 is affixed to the sleeve, for driving the ring assembly. In order to rotate the assembly at a suitable speed such as 250–400 revolutions per minute to expeditiously twist and sever the stem of a fruit engaged by the resilient cone orifice, there is provided within the cap 50, an air flow motor in the form of a bladed impeller 80 mounted on a shaft 82. The shaft is axially disposed within the cap, and journalled in a spider 84 at the lower end and is journalled in and projects through the upper end of the cap. Immediately above the cap is a gear train casing 86, which is secured to the cap end by screws 88. Within the cap is a stub shaft 90 and a driven shaft 92 extending upwardly through a bearing boss 94 in the upper wall of the casing, the shaft 92 having a driving pinion 96 on its upper end in mesh with the ring gear 78. The reduction gear train comprises a pinion 97 on the end of the impeller shaft, meshing with a stepped pinion 98 freely pivoted on the shaft 92, which in turn meshes with a stepped pinion 100 on the idler shaft, the latter meshing with a gear 102 pinned to the driving shaft 92. Within the cap, and immediately beneath the upper end thereof is an inertia flywheel 104 keyed to the impeller shaft 82. The collar 66 is provided with an integral extension in the form of a smaller collar 106 adapted to embrace the boss 94. The gear reduction may be in the ratio of 10 to 1 or higher.

A cap 108 is secured to the smaller collar 106 to enclose the gear 96, and has pivotally mounted on its end a dog 110 having a tooth 112 adapted to engage in a recess 114 in the sleeve 58 for holding the sleeve against rotation, when it is desired to unscrew the collar 62 for changing the fruit cone 60. A guard 116 extends around the collar 62 of the ring assembly, in spaced relation thereto and is secured to the collar 66 as at 118. The fruit cone is made of resilient rubber, neoprene or the like, and cones of differing orifice sizes may be employed for fruit of different average size.

In practice, the vacuum conduit 42 is secured to a tubular elongated handle, which is in turn connected to a source of vacuum, such as a portable centrifugal vacuum pump, capable of handling a substantial amount of air. Air then normally flows into the cone 60, through the ports 22 into the chamber 18, thence down the elongated cap 50 to the conduit 42. The downward flow of air rotates the bladed impeller 80 at high speed, and rotates the cone 60 at a suitable reduced speed such as 250 R. P. M. or more. The valve segments 28 are normally in the closed position shown.

When the rotating cone is brought near a fruit to be picked, the cone orifice is restricted by the fruit, and differential pressure upon the fruit draws the fruit into the revolving cone. The light frictional grip of the cone 60 upon the fruit, as it initially engages the cone imparts rotation to the fruit, and twists its stem to sever its connection to the branch. Almost instantaneously the cone is resiliently distended by the differential pressure or atmospheric air pressure on the top side acting on the fruit, and the fruit is caused to move downwardly into the upper chamber. During the passage of the fruit through the cone, vacuum is increased within the chamber providing a pull, which combined with the twist assures severance of the fruit from the branch. Once severed the fruit drops to the bottom of the upper chamber, beyond the cone, thereby opening the chamber to atmosphere through the cone orifice. The fruit engages the valve segments, opening the valve, whereupon the fruit enters the lower discharge chamber and is thereafter conveyed by a light flexible conduit or other means, to a common collection point.

It will be seen that at the moment the fruit is within the cone orifice, flow of air is momentarily cut off, and thus the flow of air normally driving the impeller fan ceases. However, the high speed of the fan shaft, with the inertia fly wheel prevents the shaft from retarding to any great extent, and provides adequate stored energy for driving the cone during the stem-severing operation. Immediately upon the cone orifice being cleared by the picked fruit following severance, air flow is restored and the inertia fly wheel regains full speed. The severing operation is for the most part effected by the powerful torque imparted to the cone, which torque is derived from the inertia of the fly wheel. When the fruit has cleared the cone, and the upper chamber returned to atmospheric pressure, the valve segments are relieved of any pressure tending to hold them closed, and thus promptly dump the fruit into the lower discharge chamber and conveyor tube.

It will be seen that the apparatus provides for positive severance of the fruit by twisting so that a minimum of strain is placed upon the fruit supporting twigs or branches. The action is such as to be effective regardless of stem length or size of fruit, and relieves the operator of having to lower the picking head to apply tension to the stem, as might be the case if the fruit were supported from a yielding branch which did not exert sufficient counter force for breaking the stem by tension, without being sprung through a considerable distance.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a fruit picking device, a hollow picking head having a fruit receiving end, rotatable annular means mounted for rotation upon and associated with the head adjacent the receiving end for frictionally contacting the body of a fruit to be picked, means connected in driving relation to said rotatable means for rotating said fruit contacting means to impart a twist to a fruit in contact therewith, and differential pressure means for reducing the pressure within said head for drawing said fruit into contacting engagement with said fruit contacting means.

2. In a fruit picking device, a hollow picking head having a fruit receiving end, rotatable annular means mounted for rotation upon and associated with the head adjacent the receiving end for frictionally contacting the body of a fruit to be picked, inertia means connected in driving relation to said rotatable means for rotating said fruit contacting means to impart a twist to a fruit in contact therewith, and differential pressure means for reducing the pressure within said head for drawing said fruit into contacting engagement with said fruit contacting means.

3. In a fruit picking device, a hollow picking head having a fruit receiving end, rotatable annular means mounted for rotation upon and associated with the head adjacent the receiving end for frictionally contacting the body of a fruit to be picked, differential pressure means for reducing the pressure within said head for drawing said fruit into contacting engagement with said fruit contacting means, and fluid pressure operated means connected in driving relation with said rotation means for rotating said fruit contacting means to impart a twist to a fruit in contact therewith.

4. In a fruit picking device, a hollow picking head having a fruit receiving end, rotatable annular means mounted for rotation upon and associated with the head adjacent the receiving end for frictionally contacting the body of a fruit to be picked, differential pressure means for reducing the pressure within said head for drawing said fruit into contacting engagement with said fruit contacting means, and fluid pressure operated inertia means connected in driving relation with said rotation means for rotating said fruit contacting means to impart a twist to a fruit in contact therewith.

5. In a fruit picking device, a hollow picking head having a fruit receiving end, a rotatable collar mounted on the fruit receiving end of the head, annular resilient orifice means adapted to contact the body of a fruit and supported by said collar for rotation therewith, differential pressure means for reducing the pressure within said head for drawing a fruit into said orifice means, and means connected in driving relation with said rotatable collar for rotating said collar to impart a twist to the stem of a fruit contacted by said orifice means.

6. In a fruit picking device, a hollow picking head having a fruit receiving end and a fruit discharge valve end, a rotatable collar mounted on the fruit receiving end of the head, annular resilient orifice means adapted to contact the body of a fruit and supported by said collar for rotation therewith, differential pressure means within said head for drawing a fruit into said orifice means, a vacuum supply conduit connected to said head intermediate said ends, and means connected in driving relation with said rotatable collar actuated by air flow in said conduit for rotating said collar to impart a twist to the stem of a fruit contacted by said orifice means.

7. In a fruit picking device, a hollow picking head having a fruit receiving end, and a valve fruit discharge end, a rotatable collar mounted on the fruit receiving end of the head, annular resilient orifice means adapted to contact a fruit and supported by said collar for rotation therewith, differential pressure means within said head for drawing a fruit into said orifice means, a vacuum supply conduit connected to said head intermediate said ends and means connected in driving relation with said rotatable collar actuated by air flow in said conduit for rotating said collar to impart a twist to the stem of a fruit contacted by said orifice means, said collar rotating means comprising a rotatable air driven impeller and inertia weight, and a speed reducer for driving said collar from said impeller and inertia weight.

8. In a fruit picking device, a hollow picking head having a fruit receiving end, and a valve fruit discharge end, a rotatable collar mounted on the fruit receiving end of the head, annular resilient orifice means adapted to contact a fruit and supported by said collar for rotation therewith, differential pressure means within said head for drawing a fruit into said orifice means, a vacuum supply conduit connected to said head intermediate said ends, and means connected in driving relation with said rotatable collar deriving fluid pressure power from said vacuum supply conduit for rotating said collar to impart a twist to the stem of a fruit contacted by said orifice means, said collar rotating means comprising a rotatable air driven impeller and inertia weight, and a speed reducer for driving said collar from said impeller and inertia weight.

9. In a fruit picking device, a hollow picking head having a fruit receiving end, and a valve fruit discharge end, a rotatable collar mounted on the fruit receiving end of the head, annular resilient orifice means adapted to contact a fruit and supported by said collar for rotation therewith, differential pressure means within said head for drawing a fruit into said orifice means, means forming an annular chamber around the body of said picking head intermediate said ends, said body having circumferentially disposed means for establishing free communication between said chamber, and the interior of said body, a vacuum supply conduit connected to said chamber forming means, and means connected in driving relation with said rotatable collar deriving fluid pressure power from said vacuum supply conduit for rotating said collar to impart a twist to the stem of a fruit contacted by said orifice means, said collar rotating means comprising rotatable air driven impeller and inertia weight, and a speed reducer for driving said collar from said impeller and inertia weight.

10. In a fruit picking device, a hollow picking head having a fruit receiving end, and a valve fruit discharge end, a rotatable collar mounted on the fruit receiving end of the head, annular resilient orifice means adapted to contact a fruit and supported by said collar for rotation therewith, differential pressure means within said head for drawing a fruit into said orifice means, a vacuum supply conduit connected to said head intermediate said ends and means connected in driving relation with said rotatable collar deriving fluid pressure power from said vacuum supply conduit for rotating said collar to impart a twist to the stem of a fruit contacted by said orifice means, said collar rotating means comprising rotatable air driven impeller and a speed reducer for driving said collar from said impeller.

11. In a fruit picking device, a hollow picking head having a fruit receiving end, and a valve fruit discharge end, a rotatable collar mounted on the fruit receiving end of the head, annular resilient orifice means adapted to contact a fruit and supported by said collar for rotation therewith, differential pressure means within said head for drawing a fruit into said orifice means, means forming an annular chamber around the body of said picking head intermediate said ends, said body having circumferentially disposed means for establishing free communication between said chamber, and the interior of said body, a vacuum supply conduit connected to said chamber forming means, and means connected in driving relation with said rotatable collar deriving fluid pressure power from said vacuum supply conduit for rotating said collar to impart a twist to the stem of a fruit contacted by said orifice means, said collar rotating means comprising rotatable air driven impeller and a speed reducer for driving said collar from said impeller.

References Cited in the file of this patent
UNITED STATES PATENTS

| | | |
|---|---|---|
| 2,581,236 | Cardinale | Jan. 1, 1952 |
| 2,661,587 | Bullock | Dec. 8, 1953 |
| 2,698,508 | Hollister | Jan. 4, 1955 |
| 2,711,625 | Bullock | June 28, 1955 |